(12) United States Patent
Birnbaum et al.

(10) Patent No.: US 7,451,460 B2
(45) Date of Patent: *Nov. 11, 2008

(54) PROGRAMMING INTERFACE FOR CONFIGURING A TELEVISION SETTOP TERMINAL

(75) Inventors: Jack M. Birnbaum, Southampton, PA (US); Chris Del Sordo, Souderton, PA (US); Stephen Allinson, Langhorne, PA (US); Kenneth P. Miller, Poway, CA (US)

(73) Assignee: General Instrument Corporation, Horsham, PA (US)

( * ) Notice: Subject to any disclaimer, the term of this patent is extended or adjusted under 35 U.S.C. 154(b) by 125 days.

This patent is subject to a terminal disclaimer.

(21) Appl. No.: 11/219,167

(22) Filed: Sep. 2, 2005

(65) Prior Publication Data

US 2006/0020974 A1 Jan. 26, 2006

Related U.S. Application Data

(62) Division of application No. 09/980,768, filed on Nov. 15, 2001, now abandoned.

(51) Int. Cl.
*G06F 9/44* (2006.01)
(52) U.S. Cl. ...................... 719/328; 725/132
(58) Field of Classification Search ............... 719/310, 719/328, 321; 725/100, 110, 131, 132, 39, 725/50, 139, 140
See application file for complete search history.

(56) References Cited

U.S. PATENT DOCUMENTS

| | | | | |
|---|---|---|---|---|
| 5,265,252 A * | 11/1993 | Rawson et al. | ............... | 719/326 |
| 5,440,632 A * | 8/1995 | Bacon et al. | ................ | 380/242 |
| 5,524,195 A * | 6/1996 | Clanton et al. | ................ | 725/61 |
| 5,619,250 A * | 4/1997 | McClellan et al. | .......... | 725/132 |
| 5,745,710 A * | 4/1998 | Clanton et al. | ................ | 725/60 |
| 5,771,064 A * | 6/1998 | Lett | ........................... | 725/134 |
| 5,784,095 A * | 7/1998 | Robbins et al. | ............... | 725/49 |
| 5,796,423 A * | 8/1998 | Robbins et al. | ............. | 725/151 |
| 6,038,625 A * | 3/2000 | Ogino et al. | ................ | 710/104 |
| 6,163,316 A * | 12/2000 | Killian | ........................ | 715/721 |
| 6,336,218 B1 * | 1/2002 | Kim | ............................ | 725/58 |
| 6,467,052 B1 * | 10/2002 | Kaler et al. | .................. | 714/39 |
| 6,510,557 B1 * | 1/2003 | Thrift | ........................ | 725/110 |

OTHER PUBLICATIONS

Evain "The Multimedia Home Platform" EBU Technical Review-Spring 1998- pp. 4-10.*
Sambar "PowerTV Operating System" Release 1.5, Oct. 1998, pp. 1-52.*
Lin "Wireless Systems and Portable Multimedia"—IEEE 1998- pp. 586-589.*
Nair "Interactive Television Settop Terminal Architectures"—IEEE 1996—pp. 233-238.*
Thrift et al. "JTV-Java-enable Television", pp. 117-122.*
Thrift et al. "JTV-Java-enable Television", Feb. 1998, pp. 117-122.*

* cited by examiner

*Primary Examiner*—Van H Nguyen
(74) *Attorney, Agent, or Firm*—Stewart M. Wiener

(57) ABSTRACT

A software interface (26) is provided to enable television settop middleware (14) and operating system (OS) software (16) to control and interact with core settop system software (20) in a subscriber television terminal to facilitate the provision of desirable digital television services, including service acquisition (e.g., acquisition of a pay-per-view movie), system information management, settop configuration and control, return path for polling, download capability, and non-volatile memory management.

22 Claims, 1 Drawing Sheet

PROGRAMMING INTERFACE FOR CONFIGURING A TELEVISION SETTOP TERMINAL

This application is a divisional of U.S. patent application Ser. No. 09/980,768 filed on Nov. 15, 2001.

BACKGROUND OF THE INVENTION

The present invention provides a software architecture that enables core software of a television settop terminal to be compatible with different settop middleware and operating system software. In particular, a software interface defines the functions and parameters passed between (i) middleware and operating system provider software, and (ii) core settop software provided in a television settop box or the like.

The recent advent of digital settop terminals has spurred the growth of subscriber television networks, such as cable/satellite television networks. Such terminals can support increased levels of programming services and a variety of software-based applications and functions, such as an electronic program guide, stock or weather banners, shop and bank at home services, games, and the like. Moreover, this trend is expected to continue with the convergence of telephone, television and computer networks, and the rise of in-home computer networks.

A "user terminal" (e.g., digital settop box) for cable or satellite television, or the like, requires OS software, middleware and device drivers to function.

OS software provides the multithreading, real-time OS support needed to operate the settop.

Middleware is software that connects two otherwise separate applications. For example, such middleware can be provided to mediate between an application program and a network, thereby managing the interaction between disparate applications across heterogeneous computing platforms. More generally, middleware serves as the glue between separate applications, and is sometimes referred to as "plumbing" because it connects two sides of an application and passes data between them.

Moreover, drivers are used to control different hardware devices in a terminal, such as tuners, demodulators, MPEG-2 decoders (e.g., audio, video, and data), video encoders, audio mixers, and so forth.

In a settop box, "core software" is provided that allows the settop to provide such necessary television functions as service acquisition, system information (SI) management, download capability (e.g., for new application and OS software), return path communication (e.g., for polling the settop for billing purposes), settop configuration, and conditional access control (i.e., security).

In the past, each settop has only been designed to use one particular operating environment. The problem of handling multiple operating environments has not previously been addressed in the settop environment. Generally, applications have been ported to various operating environments either through rewrite of the settop system software to that environment or through an abstraction layer.

Accordingly, it would be advantageous to enable a choice of different operating environments on a settop without the need to change the core settop system software. This would enable the reuse of a single settop design for multiple operating environments. It would also enable faster implementation of alternate operating software environments, permitting a faster time to market new settop devices.

In particular, the software architecture should that allow a customer, such as a cable television system operator, to choose the operating environment, including the OS kernel, middleware and application software, and device drivers, that will be used in the settop. The core settop system software should allow the device to operate within a common system environment. The architecture should allow for the development of the core software, and then implementation of the architecture in any of a plurality of different operating environments, such as VRTX, Windows CE, AperiOS, PowerTV and other settop operating environments.

The architecture should enable middleware and OS software to control and interact with the core settop system software to facilitate the provision of desirable digital television services, such as service acquisition, determining the status of a service, configuring the settop, indicating an unsolicited event, and managing user privacy.

The architecture should be suitable for terminals that receive programming services via any type of network, including broadband communications networks, Digital Subscriber Loop (DSL) networks, and others.

The present invention provides an interface to core settop system software that enjoys the aforementioned and other advantages.

It would be desirable to have an interface to core settop software that operates in such an architecture.

In particular, the interface of the invention defines each interface point between the "Application OS/Middleware" layer of the settop software and the core settop system software. This provides a mechanism by which the Application OS/Middleware software can control and interact with the core settop system software.

SUMMARY OF THE INVENTION

A software interface is provided to enable settop middleware and OS software to control and interact with core settop system software. The interface enables the middleware and OS software to interact with the core system software to facilitate the provision of desirable digital television services.

An apparatus in accordance with the invention provides an interface to core system software in a television subscriber terminal, and includes a computer readable medium having computer program code means, and means for executing the computer program code means to provide at least one application program interface (API) to enable middleware that mediates between an application program and said core system software to access a function of the terminal. A corresponding method is also presented.

BRIEF DESCRIPTION OF THE DRAWING

The FIGURE is a high level overview of a television settop box architecture incorporating a software interface between the middleware/OS layer and the core settop system software in accordance with the invention.

DETAILED DESCRIPTION OF THE INVENTION

Figure 1:
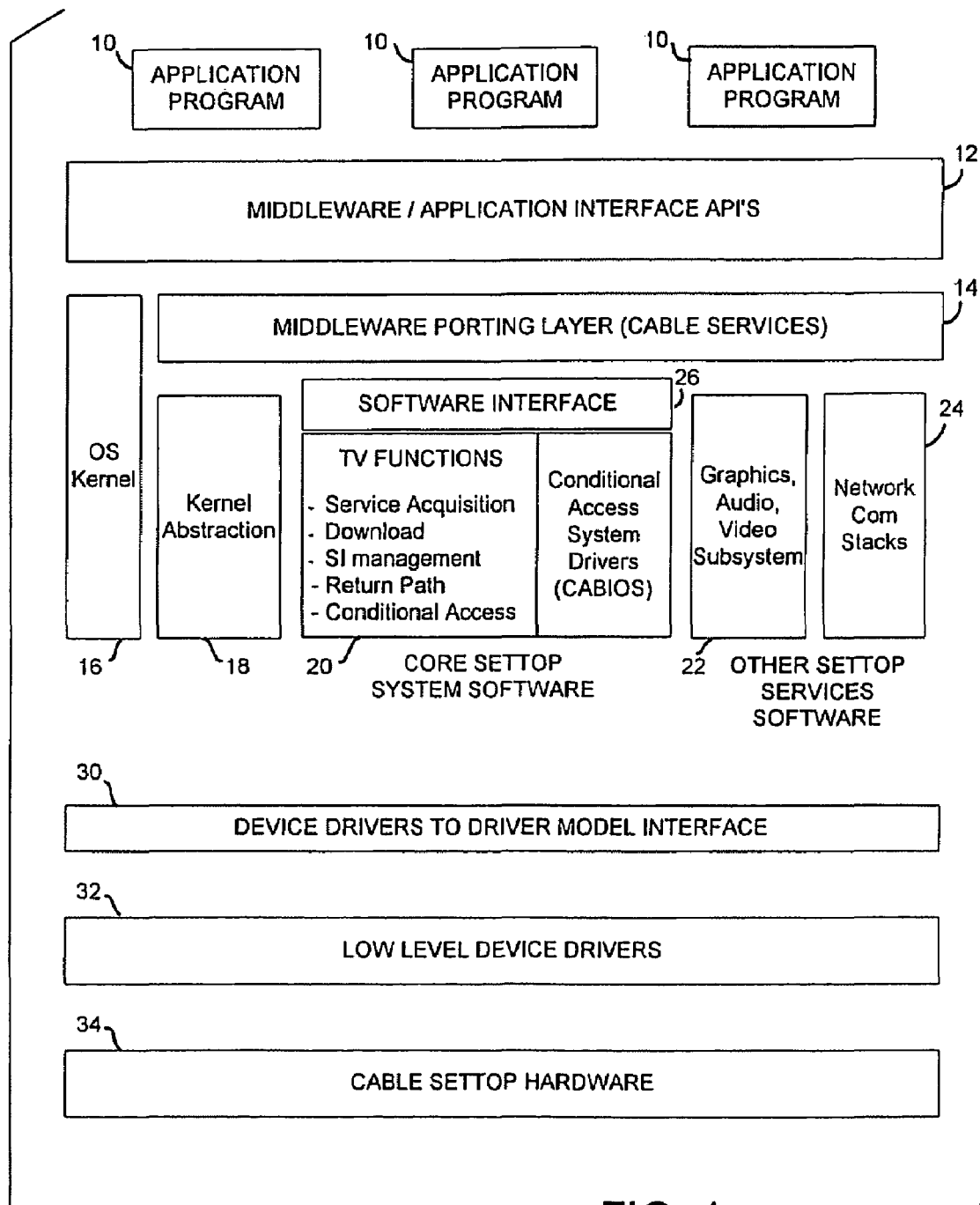

The FIGURE illustrates a software platform, or achitecture, for implementing a settop box in accordance with the present invention. The platform can be implemented using any suitable operating system, such as the VRTX (virtual real-time executive) operating system available from Mentor Graphics Corporation of Wilsonville, Oreg., Windows CE available from Microsoft Corporation of Redmond, Wash., AperiOS available from Sony Corporation of New York, N.Y., PowerTV available from PowerTV, Inc. of Cupertino, Calif., etc. Other operating systems can be used.

The architecture can be considered to include three main levels, including a lower level (functions 30, 32 and 34) related to hardware and device driver functions, a middle level (functions 14, 16, 18, 20, 22, 24 and 26) related to the core settop software, and a high level (functions 10, 12) related to middleware and applications.

Specifically, the top level of the software structure comprises one or more application programs 10 which can comprise, for example, the Digital Television (DTV) navigator application (available from Network Controls International, Inc. of Charlotte, N.C.), interactive games, enhanced television features, Internet web browsers, etc. These applications need to communicate with the core settop system software 20. This communication is accomplished with the middleware/application interface 12, the middleware porting layer 14, and the software interface 26 of the present invention.

The next layer in the software structure comprises middleware/application interface APIs (application program interfaces) 12. This layer 12 is part of the operating environment (i.e., it is OS-specific), and provides the interface to the application program(s) 10 which execute in the settop (e.g., cable settop hardware 34). The layer 12 provides facilities for applications to use and control the settop box resources, and to coexist with other applications. The layer 12 also provides the environment in which the applications execute. Layer 12 also provides the API to which applications are written, providing an authoring environment. Moreover, this layer 12 handles the issues of shared resources, multiple applications, application selection, application launch and application termination. Preferably, it provides a consistent interface to the end user.

A middleware porting layer 14, e.g., for cable, DSL or other television services, is provided to translate the television, graphics and communication interfaces 20, 22 and 24, respectively, to the particular functional interface required by a middleware software component and specified by the middleware provider/vendor. Middleware providers often specify an interface on which their software has been tested and proven. This layer 14, which is also part of the operating environment, allows portability of the middleware solution to the settop in an expedient manner. More specifically, the layer 14 allows the core settop system software 20 to remain the same while allowing different middleware layers to execute.

An operating system (OS) kernel 16 is provided at the levels of the middleware porting layer 14 and the core settop system software 20, the graphics, audio, video subsystem 22 and the network communication stacks 24. This kernel 16 can comprise, for example, a MIPS (million instructions per second) port of the VRTX kernel version 4.0, available from the Microtec division of Mentor Graphics Corporation for the Motorola 68000 family of microprocessors. This kernel 16 provides the multithreading, real time OS support needed to operate the settop. The OS kernel 16, together with the middleware porting layer 14 and middleware/application interface APIs 12, and the device drivers are components of the operating environment. More particularly, the OS kernel 16 provides OS facilities such as multitasking, inter-task communication, synchronization, and memory management. These facilities are used to create tasks, set task priorities, communicate between tasks, and synchronize operation of the system tasks and application tasks.

A kernel abstraction component 18 provides generic kernel functions needed by the other components. In particular, component 18 abstracts these functions from the specifics of the OS kernel 16. The kernel abstraction component 18 includes two sections, namely, (i) the kernel calls used by the components, and (ii) the kernel-specific translations. Some of the supported kernel features are implemented in a fashion that is independent of the underlying kernel.

The kernel abstraction component 18 may separate the details of the OS kernel from the core settop system software 20, and be used to isolate the core system software from the specifics of an OS kernel implementation. In this manner, portability of the core software 20 between operating environments is provided. The OS kernel abstraction 18 provides standard types of OS services in a generic way to the core system software 20. These services include, e.g., messaging, thread operations, memory management, synchronization, and event management.

The core settop system software 20 contains support for the television system features. For example, this software can be written to support the DigiCipher® II digital television system features. DigiCipher® II is a proprietary system developed by General Instrument Corporation of Horsham, Pa., U.S.A., the assignee hereof. This system includes features that are specific to the cable television environment for downstream and upstream communications. The features supported by the core settop system software 20 include, without limitation, service acquisition (e.g., acquisition of a pay-per-view movie), system information management, settop configuration and control, return path for polling, download capability including authentication and authorization, and non-volatile memory management.

The core settop system software 20 also includes conditional access system drivers (CABIOS), which are used to provide security and access control. This component supports the features of object authentication, object authorization, resource authorization, cryptographic tool kit, and baseline privacy key exchange. The interface layer for the cryptographic tool kit (Crypto Toolkit) is the Public Key Cryptography Standards (PKCS) 11 standard.

More specifically, the core settop system software 20 provides the services that allow the settop to exist in a communication (e.g., cable television) network. As noted above, the functions of this software include:

Message reception and distribution—This software component receives messages over a control channel or through an in-band channel, and distributes them to the appropriate software process for interpretation and processing.

System information processing—This component interprets the System Information provided by the protocol (e.g., Advanced Television Systems Committee (ATSC), or Digital Video Broadcast (DVB) standard) specifying the Modulation Type, Channel Map, Service Maps, Service Descriptions, Service Components. This information allows the software to find, reconstruct and deliver the service to the user or application.

Configuration and control message processing—This component interprets the configuration and control messages sent to the settop from, e.g., a cable headend controller. This information is used to provision a settop to operate within the cable television system or other applicable network. The component sets up the settop's features and provides the ability to control the settop operation remotely by the system operator.

Digital and analog service acquisition—This component performs all of the necessary functions to 'tune' a video/audio service to be presented to the television viewer.

Conditional access subsystem—this component authorizes services and applications. Video services are delivered to the settop in an encrypted form. The Conditional Access (CA) system compares authorization information about the service with authorization information that is delivered to the settop. When a service is deemed authorized, the CA system enables the decryption of that service.

Download subsystem—this component acquires software objects from the cable or other applicable network and stores them in the settop's memory. These objects may include, e.g., software suites or applications. The download subsystem determines if it is authorized to accept the object and, if it is, then processes and stores each segment of the object. Once the object is stored, it is validated and can then be enabled to execute either from, e.g., the headend control, or by the operating system.

Return path subsystem—This component collects purchase and diagnostic information and transmits it back to the headend (or other appropriate system operator site) upon command. This information is ultimately sent to a billing system to enable billing of services used by the settop. The return path can be a store-and-forward mechanism or an on-demand interactive mechanism.

Diagnostic Data management subsystem—This component collects and manages data which can be used to diagnose the state of the settop, allowing for remote determination of the operation and health of the settop software. This data is made available to the OS for display to the user or installer. It is also made available to the return path subsystem for collection by a computer at the system operator's site (e.g., at a cable headend).

The CABIOS (Conditional Access Basic Services) provides conditional access services above the normal service access control, including:

Object Authentication—This function authenticates a software object to determine that the object is the intended object. Such authentication is accomplished, for example, by matching a signature delivered with the object.

Object Authorization—This function authorizes objects to be loaded and executed in the settop. It uses the conditional access hardware to determine the authorization status of the settop.

Resource Authorization—This function authorizes the use of settop resources through the conditional access hardware.

Baseline Privacy Key Exchange Services—These functions support the key exchange requirements of the Cable modem system, which may conform to the Data-Over-Cable Service Interface Specifications (DOCSIS).

Cryptographic Functions—These functions provide a basic cryptographic toolkit for use by the application operating system and applications within the settop. As indicated above, a typical cryptographic tool set follows the PKCS 11 standard, although other standards can be used.

The graphics, audio and video subsystem 22 includes, in a preferred embodiment, two-dimensional (2D), three-dimensional (3D), and video libraries working on top of a graphics display driver. Such display drivers are commonly available from various vendors such as ATI Technologies Inc. of Thornhill, Ontario, Canada. Subsystem 22 provides a standard API to which middleware providers can be ported, and enables video to be viewed combined with graphics. More particularly, the analog or digital video is combined with a graphics overlay to present a combined view to the user. This subsystem 22 also provides audio, which can exist in multiple modes, such as stereo and surround sound. The audio subsystem can also support record and playback of audio files.

The network communications stacks 24 provide standardized networking stacks to facilitate web browsing and communications with external devices. This subsystem 24 includes many standardized network protocols which can be delivered over multiple communications paths. The stacks can comprise, for example, Mentor/Microtec's CNX communications extension to the VRTX operating system, available from Mentor Graphics Corporation.

This subsystem 24 resides on top of the communications drivers (e.g., Ethernet and DOCSIS drivers) and provides, for example, a Berkeley sockets (Berkeley Software Design, Inc.) interface to protocols such as Transmission Control Protocol (TCP)/Internet Protocol (IP) (e.g., a TCP/IP interface over a DOCSIS modem or over an Ethernet device), User Datagram Protocol (UDP), Address Resolution Protocol (ARP), Internet Control Message Protocol (ICMP), Dynamic Host Configuration Protocol (DHCP) Client, Domain Name System (DNS) Client, and Point-to-Point Protocol (PPP) (dial-up uses CCP, Link Control Protocol (LCP) and Internet Protocol Control Protocol (IPCP) protocols).

For the settop hardware 34 to operate the settop box for its intended functions, various drivers must be provided, as well known in the art. These are depicted in the FIGURE as low level device drivers 32, which are interfaced to a driver model used by the core settop system software 20 via device drivers-to-driver model interface 30.

The interface 30 separates the details of the driver model environment from the core system software 20, and is used to isolate the device drivers 32 from the specifics of the driver model provided by the operating environment. The low level device driver software 32 is hardware-specific and portable across operating environments. The driver model interface 30 ties the hardware-specific device driver 32 to the OS by providing the OS's desired interface to the driver. Device drivers are provided for each device supported on the settop. These include a graphics driver, which may be written, e.g., on an ATI Hardware Access Provider (HAP) layer available from ATI Technologies, Inc. A graphics library for use in the settop can written on the HAP. Other typical settop device drivers include a communications driver, the tuner (e.g., a combination of the General Instrument DOCSIS tuner and Quadrature Amplitude Modulation (QAM) code), serial ports (using, e.g., an IEEE 1394 high performance serial bus), parallel ports, Ethernet ports, Universal Serial Bus (USB) ports, Light-Emitting Diodes (LEDs), Keypad and/or Keyboard drivers, a DOCSIS driver, such as the Broadcom DOCSIS driver available from Broadcom Corporation of Irvine, Calif., U.S.A., and a smart card driver. A smart card may be used in the settop for consumer purchasing applications such as on-line buying. Each device in the settop requires a driver function to operate.

Details of the software interface 26 (termed "GITV"), which defines the services provided to application operating systems and middleware solution providers from the core settop system software 20, are set forth below. The interface can be implemented using any known techniques which will be apparent to those skilled in the art.

Software Interface Functions

1. Service Acquisition and Service Status APIs 1.1 Service Acquisition Overview

Service Acquisition is the process of allowing a client to obtain downstream services. The Service Acquisition software manages the Service Acquisition process. Support is currently provided for DigiCipher II (DCII) acquisition of primary and background digital services. DCII, proprietary to the assignee hereof, is analogous to MPEG-2. Support is also provided for analog service acquisitions.

Only one primary service can be acquired at a time. A digital primary service and an analog primary service cannot both be acquired at the same time.

1.2 AcquireServiceBlocking

Used to tune a specified virtual channel number (VCN) or source identifier (ID) using the specified service path (tuner). The service acquired is the primary service in the terminal, and replaces the previously tuned primary service. The call returns a status indicating any errors encountered while servicing the API.

1.3 AcquireServiceNonBlocking

Used to tune a specified virtual channel number (VCN) or source ID on the specified service path. AcquireServiceNon-Blocking initiates acquiring of a service but does not wait for completion of the acquisition before returning. The status returned by the API indicates any basic errors that would prevent the API from being serviced. If the initial call did not have an error, then upon completion of the service acquisition (either by success or failure), the user-defined callback function is called, passing the user-allocated callback data structure.

1.4 GetServiceStatus

Used to request status information on the currently tuned primary service on the specified service path. The API allocates and fills the service status structure, which includes the service path, virtual channel number, channel override status, service type, service component stream status, service acquisition status, and program status. The call returns a status indicating any errors encountered while servicing the API.

1.5 RegisterServiceStatus

Used to register the client for unsolicited service status updates for the currently tuned primary service on the specified service path. The status returned by the API indicates any errors that would prevent the API from being serviced. If the initial call did not have an error, when the service status changes the user-defined callback function will be called, passing the user-allocated callback data structure.

1.6 CancelServiceStatus

Used to cancel the registration for service status updates that was set up by the RegisterServiceStatus API. The call returns a status indicating any errors encountered while servicing the API.

1.7 GetVCTData

Used to get a summary of the current Virtual Channel Table information for all defined virtual channels in the system. The API allocates and fills the VCT data structure, which includes a record for each defined virtual channel. The call returns a status indicating any errors encountered while servicing the API.

1.8 GetVCTDocsisData

Used to get a summary of the current Virtual Channel Table information and characteristics for all defined DOCSIS downstream channels. DOCSIS downstream channels are defined to be any virtual channel that has a source ID equal to 23005. The API allocates and fills the VCT DOCSIS data structure, which includes a record for each defined DOCSIS channel. The call returns a status indicating any errors encountered while servicing the API. If there are no DOCSIS channels in the Virtual Channel Table, the API will return the error status value SAQERR_VCT_NO_DOCSIS, and will not allocate any memory for the DOCSIS data structure.

1.9 SelectServiceComponent

Used to add a service component of the specified type to the primary service on the specified service path. If the component is a text or data component, the API places the connect ID for the new component in the user-allocated memory location. The call returns a status indicating any errors encountered while servicing the API.

1.10 DeselectServiceComponent

Used to deselect the specified component from the primary service on the specified service path. Service components that are deselected are disabled. The call returns a status indicating any errors encountered while servicing the API.

1.11 SelectServiceIPData

Used to select a service component that carries particular multicast IP datagrams. These datagrams are carried within Digital Video Broadcast (DVB)-Multi-Protocol Encapsulation (MPE) Datagram Section messages, which contain headers with multicast MAC (Medium Access Control) addresses that are directly related to the IP datagram's multicast IP address (see Data-Over-Cable-Service Interface Specification—DOCSIS, Baseline Privacy Interface Specification [SP-BPI-101-970922]).

The calling program will select the desired multicast data by specifying the multicast MAC address. This call will return a Connection ID that is placed in memory starting at the location indicated by the pointer provided as part of the call. Connection ID identifies the packet identifier (PID) stream (or streams) carrying the requested multicast data as well as the MAC address of the target DVB-MPE datagram sections. Normally, Connection ID will be directly related to the specific multicast MAC address provided as part of the call. However, a promiscuous listening mode can optionally be selected. In this mode, every data PID component carrying IP data will be identified so all IP datagram fragments may be passed to the calling program. In the Promiscuous mode, the returned Connection ID will map to all component PIDs carrying IP data, and all valid multicast MAC addresses carried within the currently tuned service.

ReadServiceIPData requires the returned Connection ID to retrieve the requested IP data. The calling program may also specify that serving process should continue to look for the requested data, even if it does not immediately identify a target PID stream. Alternatively, the calling program may specify that only one attempt should be made to locate the PID stream carrying the requested data. The call also returns a status indicating any errors encountered while servicing the API.

1.12 ReadServiceIPData

Used to extract IP Datagram Fragments from DVB-MPE Datagram Sections being carried on one or more elementary PID stream components. The Connection ID passed to this API identifies the elementary PID stream component and multicast MAC address of the requested DVB-MPE datagram section. In some cases, the Connection ID will point to every datagram section being carried within the currently tuned service, regardless of its multicast MAC address. This occurs if a previous call to SelectServiceIPData was made with listenMode="PROMISCUOUS", rather than listenMode="NORMAL".

ReadServiceIPData returns a status as soon as the read is posted, indicating any errors encountered while servicing the API. The actual message is routed to the client by the message distribution software using the callback function and the callback data structure.

Calls to ReadServiceIPData will result in only IP datagram fragments being passed to the call back function. Thus, the DVB-MPE datagram section header and CRC trailer will be removed before passing the message (i.e., IP datagram) to the requesting client. Note that ReadServiceIPData will return, via a callback, a disconnected status if, for example, a channel change is detected.

1.13 DeselectServiceIPData

Used to deselect the specified stream component that was previously selected with the SelectServiceIPData call. This call does not require component ID as does the normal DeselectServiceComponent. Service components that are deselected are disabled. The call returns a status indicating any errors encountered while servicing the API.

1.14 PostComponentRead

Used to request a message from a text or data-service component that was previously selected using the SelectServiceComponent API. The user specifies the connection ID of the text or data-service component. The PostComponentRead returns a status as soon as the read is posted, indicating any errors encountered while servicing the API, and the actual message is routed to the client by the message distribution software, using the callback function and the callback data structure.

1.15 AcquireBackgroundServiceBlocking

Used to acquire downstream data from the specified service source. The passed array of multicast 16 addresses allows the user to specify the multicast addressed groups to receive messages for. The API places the correct ID for the new service in the user-allocated memory location. The call returns a status indicating any errors encountered while servicing the API.

1.16 AcquireBackgroundServiceNonBlocking

Used to acquire downstream data from the specified service source. The passed array of multicast 16 addresses allows the user to specify the multicast addressed groups to receive messages for. AcquireBackgroundServiceNonBlocking initiates acquiring of a service but does not wait for completion of the acquisition before returning. The API places the connect ID for the new service in the user-allocated memory location. The acknowledge response returned by the API indicates basic errors that would prevent the API from being serviced. If the initial call did not have an error then upon completion of the service acquisition (either by success or failure) the user defined callback function will be called, passing the user-allocated callback data structure.

1.17 ReleaseBackgroundService

Used to release access to downstream data from the specified service connection. The call returns a status indicating any errors encountered while servicing the API.

1.18 PostBackgroundRead

Used to receive data or text from the specified background service connection that was previously acquired using the AcquireBackgroundServiceBlocking or AcquireBackgroundServiceNonBlocking API. PostBackgroundRead returns a status as soon as the read is posted, indicating any errors encountered while servicing the API, and the actual message is routed to the client by the message distribution software, using the callback function and the callback data structure.

1.19 SourceIDtoVCN

Used to obtain the virtual channel number(s) associated with the specified SourceID. If there are multiple VCNs associated with a single source ID, the complete list of associated VCNs is returned. A successful call will fill in the API allocated structure, which includes the number of VCNs actually associated with the VCN, the number of VCN/service type pairs actually returned for the call, and the actual VCN and service type (analog vs. digital) for each of the VCNs defined. The API will assign the passed pointer to the allocated structure. The call returns a status indicating any errors encountered while servicing the API.

1.20 VCNtoSourceID

Used to obtain the Source ID associated with the specified VCN. A successful call will fill in the user allocated SourceID parameter. There is only a single source ID associated with a VCN. The call returns a status indicating any errors encountered while servicing the API.

1.21 PendingVCTChange

Used to obtain a list of pending changes to the Virtual Channel Table (VCT), from the specified (GPS-Global Positioning Satellite) time forward. A successful call will fill in the API allocated structure with the pending VCT changes and assign the passed pointer to the allocated structure. Each pending change includes the Virtual Channel Number, Service Source ID, and the Global Positioning System (GPS) time indicating when the change to the VCT is scheduled to occur. The call returns a status indicating any errors encountered while servicing the API.

1.22 GetDCBM

Used to obtain the Defined Channel Bit Map (DCBM) for the specified channel type. The DCBM is a bit-map that represents the currently defined virtual channels (services). A successful call will fill in the user allocated DCBM array. This list of defined channels is provided as a packed array of bits, with one bit location per service. A bit value of 1 represents a defined channel, 0 represents not defined. The call returns a status indicating any errors encountered while servicing the API.

1.23 ServiceComponentSplice

Used to identify the next audio and/or video components for a service, and to determine whether audio and/or video are to be switched.

1.24 AppIDtoVCN

Used to obtain the virtual channel number associated with the specified application ID. A successful call will fill in the user allocated pVcn parameter (a pointer to VCN information). There is only a single VCN associated with an application ID. The call returns a status indicating any errors encountered while servicing the API.

1.25 VCNtoAppID

Used to obtain the application ID associated with the specified VCN. A successful call will fill in the user allocated application ID parameter. There is only a single application ID associated with a VCN. The call returns a status indicating any errors encountered while servicing the API.

1.26 SourceNametoAppID

Used to obtain the application ID associated with the specified source name string. A successful call will fill in the user allocated pAppID parameter (a pointer to where to place the application ID). There is only a single application associated with a source name string. The call returns a status indicating any errors encountered while servicing the API.

1.27 AppIDtoSourceName

Used to obtain the source name string ID associated with the specified application ID. A successful call will fill in the API allocated source name string parameter and the user allocated name length parameter. There is only a single source name string associated with an application ID. The call returns a status indicating any errors encountered while servicing the API.

2. System APIs 2.1 SysRequestConfiguration

Used to get the current terminal configuration. The call returns a status indicating any errors encountered while servicing the API.

2.2 SysRequestEPGConfig

Used to get the following Electronic Program Guide (EPG) information:

Group Assignment Configuration—A list of current Group Assignments.

Group Assignments provide a means of assigning a settop to a particular application group.

Currency Region Configuration—Defines the currency region. The currency region can be used to define different cost regions.

EPG Region Configuration—Specifies the logical location of the DCT, from the application's perspective.

Preferred Language—The current preferred language.

The call returns a status indicating any errors encountered while servicing the API.

2.3 SysRequestStatus

Used to get the current converter system status. The call returns a status indicating any errors encountered while servicing the API.

2.4 SysRequestTimestamp

Used to get a system timestamp with local time to the second, current date, time zone information, etc. The call returns a status indicating any errors encountered while servicing the API.

2.5 SysTimestampRegister

Used to register the client for unsolicited system timestamp updates. The system timestamp indicates local time to the second, including the current date, day of the week, time zone information, etc. The system timestamp is received from the headend and forwarded asynchronously to the client. The status returned by the API indicates any errors that would prevent the API from being serviced. If the initial call did not have an error, then whenever a new system timestamp is received, the user defined callback function will be called, passing the user-allocated callback data structure.

2.6 SysTimestampCancel

Used to cancel the registration for system time updates that was set up by the SysTimestampRegister API. The call returns a status indicating any errors encountered while servicing the API.

2.7 SysSetRFOutChannel

Used to set the output channel number for the radio frequency (RF) modulator hardware. The call returns a status indicating any errors encountered while servicing the API.

2.8 SysControlOnOffState

Used to set the terminal to the On or Off state. The call returns a status indicating any errors encountered while servicing the API.

2.9 SysControlACRelay

Used to switch between the different utility outlet modes. The terminal features the ability to control the operation of a utility outlet between switched (automatic mode) control and continuous force on / continuous force off modes. When the terminal is in the automatic mode, the utility outlet will be powered while the terminal is in the ON state and unpowered while the terminal is in the OFF state. The manual operation modes allow the application to set the utility (U.S. type) outlet ON continuously or OFF continuously. The call returns a status indicating any errors encountered while servicing the API.

2.10 SysControlRFBypass

Used to select whether the RF signal is routed through the terminal or bypasses the terminal. This feature allows more friendly operations with cable-ready TVs and VCRs. The feature duplicates the TV/VCR switch found in many VCRs. The act of turning OFF the terminal will force the bypass condition. The cable operator may override the selected state. The actual state can be determined using SysRequestStatus( ). The call returns a status indicating any errors encountered while servicing the API.

2.11 SysSetLanguage

Used to set the consumer's preferred language. The call returns a status indicating any errors encountered while servicing the API.

3. Unsolicited Event Indication APIs 3.1 UsolEventRegister

Used to register clients for unsolicited event indication messages. The status returned by the API indicates any errors that would prevent the API from being serviced. If the initial call did not have an error, then whenever a new event occurs for which a client is registered, the user defined callback function will be called, passing the user-allocated callback data structure.

3.2 UsolEventCancel

Used to cancel the registration for an unsolicited event indication that was set up by the UsolEventRegister API. The call returns a status indicating any errors encountered while servicing the API.

4. Baseline Privacy Interface APIs 4.1 Purpose & Scope

This section is intended to define a BPI cryptographic services interface by defining a set of API functions to support BPI key management (BPKM) protocol for a DOCSIS driver. These APIs shall not be responsible for the implementation of Authorization and Traffic Encryption Key (TEK) state machines in BPKM.

4.2 Security Objectives and Goals

API functions are defined to provide cryptographic services for the above-mentioned two state machines only. The cryptographic services shall include the following:

Provide Cable Modem's RSA public key to the DOCSIS Driver.

Perform RSA decryption operation on encrypted Authorization Key provided by DOCSIS Driver. There are two independent modes in which the GI BPI APIs can be included into the code.

Shall return decrypted Authorization Key to the DOCSIS Driver if DOCSIS Driver has capability of deriving all of the necessary remaining keys. If this mode is selected, only two BPI APIs need to be included in the code (CMExportID, CMAuthKey).

Shall not return decrypted Authorization Key to the DOCSIS Driver. If this mode is selected, then five BPI APIs need to be included in the code (CMExportID, CMDeriveKeys, CMGenerateHMAC, CMVerifyHMAC, CMDecryptTEK).

Generate Key Encryption Key (KEK) based on the decrypted Authorization Key, but shall not return KEK to the DOCSIS Driver.

Generate upstream hashed-based message authentication code (HMAC) Key, but shall not return the upstream HMAC key to the DOCSIS Driver.

Authenticate the Key Request message, and return the upstream HMAC keyed message digest to the DOCSIS Driver.

Generate downstream hashed-based message authentication code (HMAC) Key, but shall not return the downstream HMAC key to the DOCSIS Driver. Validate the downstream HMAC using the downstream HMAC key. Decrypt DES encrypted Traffic Encryption Key (TEK) using KEK, and return TEK to the DOCSIS Driver.

4.3 Definitions, Acronyms, Abbreviations

BPI Baseline Privacy Interface
BPKM Baseline Privacy Key Management protocol
CM Cable Modem
CMTS Cable Modem Termination System
CBC Cipher Block Chaining
CSP Interface Cryptographic Service Provider
DES Data Encryption Standard algorithm (FIPS-46, FIPS-46-1, FIPS-74, FIPS-81)
DOCSS Data Over Cable Security System
DOCSIS Data Over Cable Service Interface Specifications
HMAC Hashed-based Message Authentication Code
KEK Key Encryption Key
RSA Rivest Shamir Adleman, public key encryption technique
SHA Secure Hash Algorithm
SID Service Identification
TEK Traffic Encryption Key 4.4 Message Support Functions CMExportID Used to export CM-Identification attributes from the BPI Cryptographic Service Provider (CSP). CM-Identification attributes are used in Authorization Request and Key Request messages.

CMAuthKey

Used to decrypt the Authorization Key (Auth Key) sent in the Authorization Reply message, and then pass the decrypted Auth Key back to the caller. This function shall be called by the DOCSIS Driver immediately when a Authorization Reply message is received from a CMTS. If the calling entity uses this API then the calling entity will be required to derive the Key Encryption Key (KEK), upstream HMAC key (HMAC_KEY_U), and downstream HMAC key (HMAC_KEY_D). This API will be used in the WinCE based ASTB. The determination of whether to include this API or the CMDeriveKeys API will be determined by the customer requirements. Based on these requirements, one or the other API will be part of the compile for that systems software build.

CMDeriveKeys

Used to derive the Authorization Key (Auth Key), the Key Encryption Key (KEK), upstream HMAC key (HMAC_KEY_U), and downstream HMAC key (HMAC_KEY_D). This function shall be called by the DOCSIS Driver immediately when a Authorization Reply message is received from a CMTS. The BPI CSP shall maintain a single active authorization key and associated derived keys. Auth Key, KEK, HMAC_KEY_U, and HMAC_KEY_D shall not be available to DOCSIS Driver. This API shall be used when the DOCSIS driver does not have the capability to derive all of the needed keys from the Auth Key.

CMGenerateHMAC

Used to generate a keyed message digest (HMAC-Digest) for the Key Request message (an upstream message from CM to CMTS), as defined in BPI Spec. HMAC-Digest shall be returned to the DOCSIS Driver.

CMVerifyHMAC

Used for CM to authenticate the Key Reply, Key Reject, and TEK Invalid message.

CMDecryptTEK

Used for CM to decrypt the TEK-Key sub-attribute in a SA-Parameters attribute, as defined in section 4.2.1.5 of BPI Spec. This API will only produce one clear TEK each time it is accessed. In order for the Cable Modem (CM) to meet the requirement to have the primary and the secondary TEK available the DOCSIS driver will need to make this API call twice. The DOCSIS driver shall keep track of which call to the API is for the primary TEK and which call is for the secondary TEK.

5. Downloader APIs 5.1 Overview

The Downloader provides an API for applications and the App OS to manage objects loaded into the DCT5000 either from the head-end or via API calls.

5.2 FindFirstObject

Used to search for a currently loaded object and return information about it. It can be used in conjunction with the FindNextObject API to search the object directory for all objects matching specified criteria. The call returns a status indicating any errors encountered while servicing the API.

5.3 FindNextObject

Used to search for the next currently loaded object and return information about it. It is used in conjunction with the FindFirstObject API to search the object directory for all objects matching specified criteria. The FindFirstObject call must have returned a successful result before this call can be used to continue a search. All parameters specified on the FindNextObject must match those from the previous FindNextObject or the FindFirstObject call. Once a not found condition is returned, a FindFirstObject must be used to start a new search. This call returns a status indicating any errors encountered while servicing the API.

5.4 RegisterObjectManager

Used by the App OS to register as the manager for managed objects. The Downloader will notify the object manager via a callback whenever a managed object's state changes or is requested to change (e.g., delete message from head-end). The call returns a status indicating any errors encountered while servicing the API.

5.5 WriteCompleteObject

Used to create and write an object in one atomic operation. This is useful when the object has been completely loaded into a memory buffer. The call returns a status indicating any errors encountered while servicing the API.

5.6 CreateObject

Used to prepare for an object to be written to memory, including allocating space for it. This is useful for creating an object when all the data for the object is not presently available in memory (see WriteCompleteObject). The call returns a status indicating any errors encountered while servicing the API. The combination of CreateObject, WriteObject, and CloseObject can be used to create an object that is not available all at once to be written in a single write operation (as with WriteCompleteObject). The caller is responsible for tracking the areas of the object that have been written to. If a CloseObject is issued before all parts of the object have been written, the contents of unwritten portions of the object may contain random values (i.e., no attempt is made by WriteObject to track what areas have been written to). If an attempt is made to write new data over data already written with a previous WriteObject, either the new data will be successfully stored over the old data (if in RAM) or a write error will occur (if in flash memory).

5.7 WriteObject

Used write a portion of an object to memory. The call returns a status indicating any errors encountered while servicing the API.

5.8 CloseObject

Used to terminate writing to object memory for a specified object. The call returns a status indicating any errors encountered while servicing the API.

5.9 ReadObject

Used to obtain the contents of the specified object. The call returns a status indicating any errors encountered while servicing the API.

5.10 DeleteObject

Used to remove one or more objects from memory. The call returns a status indicating any errors encountered while servicing the API.

5.11 PurgeObject

Used to remove one or more objects from memory. The call returns a status indicating any errors encountered while servicing the API.

5.12 Callback Functions

Object Manager Callback

The object manager may receive callbacks from the Downloader, depending on activity that occurs in the DCT5000 related to downloaded objects. When a significant event occurs, the object manager is called with a pointer to the callback structure that identifies the event and the object to which the event applies. Callbacks are issued as events occur, so there may be more than one outstanding callback at any given time. The structure is both allocated and deallocated by the Downloader.

6. Purchase and Authorization APIs 6.1 PurchaseProgramImmediate

Requests that the program on the currently tuned VCN be purchased. The specified VCN must match the currently tuned VCN, and ServiceStatus should indicate that the program is purchasable.

6.2 PurchaseProgram

Requests that the program on the currently tuned VCN be purchased. The specified VCN must match the currently tuned VCN, and ServiceStatus should indicate that the program is purchasable.

6.3 CancelProgramPurchase

Requests that the purchase of the specified program be canceled. The cancel ID and the VCN are required to cancel a previously purchased program. It is not necessary to be tuned to the specified VCN in order to cancel a purchase. The cancel ID is used to uniquely identify the purchase to be canceled, and the VCN is used as a secondary cross-reference. Note that the purchase must be "cancelable" for the request to be fulfilled. A purchase is cancelable if the time of the cancellation falls within th e Cancelable Window and the headend has configured the terminal to allow canceling. The Cancelable Window is defined (approximately) as the time between the start of the Interactive Pay Per View (IPPV) window and the end of the free preview (i.e., IPPV start+free preview duration).

6.4 PurchasePackageImmediate

Requests that the program package indicated by the PackageName on the currently tuned VCN be purchased. The specified VCN must match the currently tuned VCN, and ServiceStatus should indicate that the package is purchasable.

6.5 PurchasePackage

Requests that the program package indicated by the PackageName on the currently tuned VCN be purchased. The specified VCN must match the currently tuned VCN, and ServiceStatus should indicate that the package is purchasable.

6.6 CancelPackagePurchase

Requests that the purchase of the specified packaged service be canceled. The cancel ID and the VCN are required to cancel a previously purchased program. It is not necessary to be tuned to the specified VCN in order to cancel a purchase. The cancel ID is used to uniquely identify the purchase to be canceled, and the VCN is used as a secondary cross-reference. Note that the purchase must be "cancelable" for the request to be fulfilled. A purchase is cancelable if the time of cancellation falls within the Cancelable Window and the headend has configured the terminal to allow canceling. The Cancelable Window is defined (approximately) as the time between the start of the IPPV window and the end of the free preview (i.e. IPPV start+free preview duration).

6.7 GetPendingPurchases

Requests all purchases that are pending. Typically, this function is utilized following system start-up to determine what purchases are outstanding. The user can then provide a callback function for each pending purchase using the PurchaseCallbackRefresh API. This API provides purchases of all types, including analog programs, digital programs and digital packages. Only certain parameters are valid in each case.

6.8 PurchaseCallbackRefresh

This API is utilized by the user, following system start-up, to refresh the purchase callback function pointer for a specified program or package purchase.

7. Password APIs 7.1 SettopSetPassword

Sets the password for indicated slot. Password slot PARENTAL_PASSWORD is used for the Parental Control password and slot PURCHASE_PASSWORD for purchasing. Additional slots may be provided for generic passwords, depending on the terminal model. A password is an array of PASSWORD_LENGTH characters. The call returns a status indicating any errors encountered while servicing the API.

7.2 SettopCheckPassword

Verifies the indicated password for a particular slot. Password slot PARENTAL_PASSWORD is used for the Parental Control password and slot PURCHASE_PASSWORD for purchasing. Additional slots may be provided for generic passwords, depending on the terminal model. If the password has been cleared or never been set, any password will match. The call returns a status indicating any errors encountered while servicing the API.

8. Initialization APIs 8.1 StartGITV

Starts GITV. The application operating system is the external client that interfaces to this API. The call returns a status indicating any errors encountered while servicing the API.

8.2 IsGITVReady

Verifies GITV is running. The application operating system is the external client that interfaces to this API. The call returns a status indicating any errors encountered while servicing the API.

9. Platform Configuration APIs 9.1 GetSDRAMInfo

Checks the validity of SDRAM, returning the starting address, size and validity of the SDRAM installed in the settop. The call returns a status indicating any errors encountered while servicing the API.

9.2 GetEndianStatus

Returns the ENDIANness of the CPU at initialization.

9.3 GetNVMEMInfo

Checks the validity of NVMEM, returning the starting address, size and validity of the NVMEM installed in the settop. The call returns a status indicating any errors encountered while servicing the API.

9.4 GetSettopIDs

Retrieves information about the settop including the Platform ID, Manufacturer, Family and Model information. The call returns a status indicating any errors encountered while servicing the API.

9.5 GetTSIInfo

Retrieves the processor, bridge type and crystal speeds for the settop, in addition to the MAC addresses for DOCSIS, Ethernet, 1394, USB, and Settop. The call returns a status indicating any errors encountered while servicing the API.

9.6 GetMemoryInfo

Retrieves memory size information for miscellaneous memory components of the settop. The call returns a status indicating any errors encountered while servicing the API.

9.7 GetCableModemInfo

Retrieves cable modem and DOCSIS option information. The call returns a status indicating any errors encountered while servicing the API.

9.8 GetMiscellaneousInfo

Retrieves the type of output channel in use by the settop. The call returns a status indicating any errors encountered while servicing the API.

9.9 Get1394Info

Retrieves information about the 1394 interface installed in the settop. The call returns a status indicating any errors encountered while servicing the API.

9.10 GetEthernetInfo

Retrieves information about the Ethernet interface installed in the settop. The call returns a status indicating any errors encountered while servicing the API.

9.11 GetParallelPortInfo

Retrieves information on the parallel port installed in the settop. The call returns a status indicating any errors encountered while servicing the API.

9.12 GetHardDriveInfo

Retrieves the type of hard drive currently installed in the settop. The call returns a status indicating any errors encountered while servicing the API.

9.13 GetPlatformInfo

Retrieves the type of platform and the version of the platform currently running in the settop. The call returns a status indicating any errors encountered while servicing the API.

10. Diagnostic APIs 10.1 GetErrorStatus

Indicates the type of error when an error has occurred. Since the settop could be one of the following: Bootloader, Base Platform or Native Suite, the coding scheme and interpretation may differ per platform. This API does not support the Bootloader error codes. These can be found in the Start-up Database. This call returns a status indicating any errors encountered while servicing the API.

10.2 GetPurchasesStatus

The GetPurchaseStatusdiagnostic contains information related to IPPV purchases in the settop. This call returns a status indicating any errors encountered while servicing the API.

10.3 GetOutputPortStatus

The output port status contains information related to the terminal output or re-modulated (Remod) port. The output/Remod port is the interface from the terminal to the subscriber's television set. This call returns a status indicating any errors encountered while servicing the API.

10.4 GetLastReset

The GetLastReset indicates the last reset time in GPS seconds, the type of reset that occurred and the last Fatal Error Log entry.

10.5 GetVCTID

Indicates the VCT ID for the virtual channel table that is resident in the settop.

10.6 GetOOBStatus

Indicates the status of the OOB stream components. This call returns a status indicating any errors encountered while servicing the API.

10.7 GetInbandStatus

Indicates the status of the current INBAND multiplex.

10.8 GetUnitAddresses

Indicates the unit addresses assigned to the settop. This call returns a status indicating any errors encountered while servicing the API.

10.9 GetCurrentChannelStatus

Indicates the status of the last attempted primary service acquisition.

10.10 GetRenewableSecurityStatus

The concept of Renewable security changes to support DES decryption or the original Conditional Access. The renewable security slot has a PCMCIA Type II form factor, contains 2 MB secure non-volatile memory, supports cryptographic on-board key generation and encryption and DES decryption rate of 80 Mbps.

10.11 GetRFModemStatus

Indicates the transmission status of the RF modem installed in the settop. This call returns a status indicating any errors encountered while servicing the API.

10.12 GetCodeModuleStatus

Indicates the status for any firmware loaded into flash memory and all versions of non-volatile code that is installed in the settop.

10.13 GetMemoryStatus

Indicates the memory configuration for the settop. This call returns a status indicating any errors encountered while servicing the API.

10.14 GetDOCSISStatus

This API is used to retrieve DOCSIS diagnostics information from the AppOS for On Screen Diagnostics or reportback. The call returns a status indicating any errors encountered while servicing the API.

10.15 GetUSBStatus

Returns status of the USB port and any installed devices. The call returns a status indicating any errors encountered while servicing the API.

10.16 Get1394Status

Returns status of the 1394 port. The call returns a status indicating any errors encountered while servicing the API.

10.17 GetEthernetStatus

Returns status of the Ethernet port. The call returns a status indicating any errors encountered while servicing the API.

10.18 GetParallelStatus

Returns status of the Parallel port. The call returns a status indicating any errors encountered while servicing the API.

10.19 GetIRBlasterStatus

Returns status of the IR blaster (transmitter). The call returns a status indicating any errors encountered while servicing the API.

10.20 GetIRKeyboardStatus

Returns status of the IR keyboard. This call returns a status indicating any errors encountered while servicing the API.

10.21 GetIRRemoteStatus

Returns status of the IR remote. The call returns a status indicating any errors encountered while servicing the API.

10.22 GetSmartCardStatus

Returns status of the Smart Card. The call returns a status indicating any errors encountered while servicing the API.

10.23 GetHardDriveStatus

Returns status of the hard drive. The call returns a status indicating any errors encountered while servicing the API.

10.24 GetSettopGraphicsStatus

Returns status of the settop graphics system. The call returns a status indicating any errors encountered while servicing the API.

10.25 GetNetworkAdapterStatus

Indicates whether a network adapter is available in addition to associated parameters and/or status.

10.26 GetResourceAuthorizationStatus

This API returns the Resource Authorization status for each resource in the settop.

10.27 GetMPEGLockStatus

This API returns the lock status of the MPEG video and audio streams, as well as the Program Clock Reference (PCR).

11. Audio Server APIs 11.1 AudioControlModeSelect

The Audio Control Mode Select API call allows a client to set the DCT5000's Audio Output Mode. Selections include: Surround, Stereo, and Mono.

11.2 AudioControlVolumeModeSelect

The Audio Control Volume Mode Select API call allows a client to set or adjust GITV's Volume Unit definition. This API call is independent of service type, Analog or Digital.

11.3 AudioControlLoopThruSelect

The Audio Loop Thru Control API call allows a client to enable or disable Audio Loop Thru.

Loop Thru Enabled (On): Settop outputs the external audio source on the baseband connectors.

Loop Thru Disable (Off): Settop mutes the external audio source.

11.4 AudioControlAC3CompressionSelect

The AC-3 Compression Control API call allows a client to set the AC-3 Dynamic Range Compression Mode: No Compression, Light Compression or Heavy Compression.

11.5 AudioControlSAPSelect

The SAP Selection API call allows a client to select the Secondary Audio Program (SAP) Audio Source within an Analog Service, if available. This operation only applies to a single Analog Service. Specifically, the settop only allows SAP to be selected while acquired or tuned to an Analog Service with SAP.

11.6 AudioControlSPDIFSelect

The Sony Philips Digital Interface Format (SPDIF) Selection API call allows a client to select the settop's SPDIF or Digital Audio Output path over the Analog Audio Output paths (remod and baseband).

The settop provides three SDPIF output modes:

SPDIF Enabled: Settop outputs audio over SPDIF, baseband and remod audio is unavailable. Audio output formats include: downmixed surround (l+r), stereo, and mono.

SPDIF Enabled with Full AC-3 Output: Settop outputs AC-3 directly over SDPIF. AC-3 output only applies the Digital Services. Stereo or Mono output for Analog Services over SPDIF. Requires an AC-3 decoder downstream from the settop.

SPDIF Disabled: Settop outputs audio over the Analog Output paths (remod, and baseband). Audio output formats include: downmixed surround (l+r), stereo, and mono.

11.7 AudioVolume (Basic Control)

This API call allows a client to adjust the settop's master audio volume. The settop adjusts both the left and right channel outputs.

11.8 AudioVolumeBalance (Balance Control)

This API call allows a client to adjust the settop's master audio volume with separate left and right channel values.

11.9 AudioMute

Select master Audio Mute mode on or off.

11.10 AudioTvVolume (Basic Control)

This API call allows a client to adjust the relative volume of TV audio sources. This call adjusts both the left and right channel outputs.

11.11 AudioTvVolumeBalance (Balance Control)

The TV Balance Volume Control API call allows a client to adjust the relative volume of TV audio sources with separate left and right channel values.

11.12 AudioTvMute

Select TV Audio Mute mode on or off.

11.13 AudioLocalVolume (Basic Control)

This API call allows a client to adjust the relative volume of local audio sources (PCM, wave, etc.). This call adjusts both the left and right channel outputs.

11.14 AudioLocalVolumeBalance (Balance Control)

This API call allows a client to adjust the relative volume of local audio sources (PCM, wave, etc.) with separate left and right channel values.

11.15 AudioLocalMute

Select Local Audio Mute mode on or off.

11.16 AudioStatus

The GITV Audio Server provides a single API call to report Audio Status.

12. Video Server APIs 12.1 VideoTvBlank

Select TV Video Blank mode on or off.

12.2 VideoControlTvBlankModeSelect

This API call controls how the TV video is blanked by the settop. The default values are defined so that the video operates as it did before the call was introduced.

12.3 VideoStatus

The GITV Video Server provides a single API call to report Video Status.

13. Resource Authorizations 13.1 ResourcePermissionCheck

Used to obtain the permission status of a resource. When used in the Global mode, the API takes the resourceID as an input parameter and attempts to lookup the ID in the resource/tier/status table. If the ID is found, the permission status is returned to the caller. If the ID is not found or a table does not exist, the API will return an error.

If the API is to be used in the Application mode, the caller must include the Object ID and the Object version pointer as additional input parameters. In this case the API will verify the Global access for the ASTB as well as verify that the Object has access to the resource.

13.2 ResAuthStatusRegister

Used to register the client to receive a notification if the authorization status of a resource changes. The status returned by the API indicates any errors that would prevent the API from being serviced. Once registered for a particular resource, whenever the authorization status for that resource changes, the user will be notified using the callback mechanism.

13.3 ResAuthStatusCancel

Used to cancel the registration for a resource authorization status indication that was set up by the ResAuthStatusRegister API. The call returns a status indicating any errors encountered while servicing the API.

14. High Definition Passthrough APIs 14.1 GITV_Get13945CData

This function is called to obtain the block of protected flash data containing the DTCP data.

14.2 GITV_Set1394NVRAMData

This function is called to write the block of non-volatile random access memory (NVRAM) data containing the DTCP data.

14.3 GITV_Get1394NVRAMData

This function is called to read the block of NVRAM data containing the DTCP data.

14.4 GITV_GetTextDescriptor

Provides an alphanumeric description of the settop on the 1394 bus.

14.5 GITV_DTVConnectStatus

Defines the current state of the DTV connection.

14.6 GITV_Get13945CSRM

This function is called to obtain the 1394 5C SRM (System Renewability Message(s)). These messages contain certificate revocation lists of devices that are no longer 5C compliant. This is used to ensure the long-term integrity of the system. The SRM format is described in chapter 7 of the 1394 5C specification "Digital Transmission Content Protection Specification" Volume 1, Revision 1.0 dated Apr. 12, 1999.

It should now be appreciated that the present invention provides a software interface that enables television settop middleware and operating system (OS) software to control and interact with core settop system software in a subscriber television terminal to facilitate the provision of desirable digital television services, including service acquisition (e.g., acquisition of a pay-per-view movie), system information management, settop configuration and control, return path for polling, download capability including authentication and authorization, and non-volatile memory management.

Moreover, the software interface is operable in an architecture that enables core settop software to be compatible with multiple settop operating environments. With this software architecture, it is not necessary to port the core software to different operating environments by rewriting code specific to each environment or through an abstraction layer. Instead, a unique device drivers-to-driver model interface is provided together with a kernel abstraction component that overcomes portability issues and provides for a clean interface between layers in the architecture.

The invention can be implemented using object oriented techniques, such as C++ or Java programming, although the invention is by no means limited to such an implementation.

The combination of the components described herein provides a basis for settop software to enable advanced features of an advanced settop box implementation. Each of the components provides necessary functions required by an advanced settop terminal. The novel architecture of the invention provides the benefits of reuse and portability of the core settop software to alternate operating environments, thereby allowing well-understood and previously tested software components to be reused. The architecture also allows implementations in alternate operating environments to be quickly and straightforwardly provided.

Although the invention has been described in connection with various specific implementations, it should be appreciated that various adaptations and modifications can be made thereto without departing from the scope of the invention as set forth in the claims.

What is claimed is:

1. A system comprising a computer readable medium having computer program code for providing an interface to core system software in a user terminal;

the terminal having means for executing said computer program code, and having operating system software selected from a plurality of alternative operating software environments;

wherein the computer program code is adapted to provide at least one application program interface (API) to enable middleware that mediates between an application program and the core system software to access a function of the terminal, and to enable the operating system software to access the function of the terminal;

the API being compatible with the plurality of alternative operating software environments;

wherein said function of the terminal comprises managing a configuration of the terminal.

2. The system of claim 1, wherein:

the function of the terminal comprises obtaining at least one of:

current terminal configuration information;

Electronic program guide (EPG) information;

current converter system status; and a system timestamp with local time.

3. The system of claim 1, wherein:

the function of the terminal comprises at least one of:

registering a client for unsolicited system timestamp updates; and canceling a registration for system timestamp updates.

4. The system of claim 1, wherein:

the function of the terminal comprises setting an output channel number for RF modulator hardware.

5. The system of claim 1, wherein:

the function of the terminal comprises setting the terminal to an On or Off state.

6. The system of claim 1, wherein:

the function of the terminal comprises switching between different utility outlet modes.

7. The system of claim 1, wherein:

the function of the terminal comprises selecting whether an RF signal is routed through the terminal or bypasses the terminal.

8. The system of claim 1, wherein:

the function of the terminal comprises setting a consumer's preferred language.

9. The system of claim 1, wherein:

the function of the terminal comprises managing privacy.

10. The system of claim 1, wherein:

the function of the terminal comprises searching for a currently loaded object and returning information thereof.

11. The system of claim 1, wherein:

the function of the terminal comprises at least one of:

preparing for an object to be written to memory, including allocating space for the object;

writing a portion of an object to memory; and terminating writing to object memory for a specified object.

12. The system of claim 1, wherein:

the function of the terminal comprises obtaining contents of a specified object.

13. The system of claim 1, wherein:

the function of the terminal comprises removing at least one object from memory.

14. The system of claim 1, wherein:

the function of the terminal comprises purchasing a program.

15. The system of claim 1, wherein:

the function of the terminal comprises enabling a user of the terminal, following system star-up, to refresh a purchase callback function pointer for a specified program or package purchase.

16. The system of claim 1, wherein:

the function of the terminal comprises setting and/or checking a password.

17. The system of claim 1, wherein:

the function of the terminal comprises at least one of:

setting the password for an indicated time slot; and verifying a indicated password for a particular time slot.

18. The system of claim 1, wherein:

the function of the terminal comprises retrieving at least one of:

memory size information for memory components of the terminal;

at least one of cable modem and DOCSIS option information;

the type of output channel in use by the terminal;

information regarding an IEEE 1394 interface installed in the terminal;

information regarding an Ethernet interface installed in the terminal;

information regarding a parallel port installed in the terminal;

information regarding the type of hard drive currently installed in the terminal; and information regarding the type of platform and the version of the platform currently running in the terminal.

19. The system of claim 1, wherein:

the function of the terminal comprises diagnosing errors at the terminal.

20. The system of claim 1, wherein:

the function of the terminal comprises indicating at least one of:

the last reset time, the type of reset that occurred and the last Fatal Error Log entry;

a Virtual Channel Table ID for the virtual channel table that is resident in the terminal;

a status of out-of-band stream components;

a status of a current in-band multiplex;

a unit address assigned to the terminal;

a status of a last attempted primary service acquisition;

a renewable security status;

a transmission status of a RF modem installed in the terminal;

a status for firmware loaded into flash memory and all versions of non-volatile code that are installed in the terminal; and a memory configuration for the terminal.

21. The system of claim 1, wherein:

the function of the terminal comprises returning a status of at least one of:

a USB port;

any installed devices;

an IEEE 1394 port;

an Ethernet port;

a parallel port;

an infra-red (IR) transmitter;

an IR keyboard;

an IR remote control;

a smart card;

a hard drive; and a graphics system.

22. The system of claim 1, wherein:

the function of the terminal comprises controlling a video output of the terminal.

* * * * *

UNITED STATES PATENT AND TRADEMARK OFFICE
CERTIFICATE OF CORRECTION

PATENT NO. : 7,451,460 B2  Page 1 of 1
APPLICATION NO. : 11/219167
DATED : November 11, 2008
INVENTOR(S) : Birnbaum et al.

It is certified that error appears in the above-identified patent and that said Letters Patent is hereby corrected as shown below:

COLUMN 2:
Lines 58-59: Please delete "achitecture" and replace with --architecture--

COLUMN 15:
Line 54: Please delete "th e" and replace with --the--

COLUMN 19:
Line 59: Please delete "SDPIF" and replace with --SPDIF--
Line 64: Please delete "SDPIF." and replace with --SPDIF.--

COLUMN 22:
Line 27: In Claim 2, please delete "Electronic program guide" and replace with --Electronic Program Guide--

COLUMN 23:
Line 11: In Claim 15, please delete "star-up," and replace with --start-up,--

Signed and Sealed this

Twenty-eighth Day of July, 2009

JOHN DOLL
*Acting Director of the United States Patent and Trademark Office*